(12) United States Patent
Jaeger (10) Patent No.: US 9,333,574 B2
(45) Date of Patent: May 10, 2016

(54) HONING MACHINE WITH OIL-TIGHT OPERATING TANK

(71) Applicant: FELSOMAT GmbH & Co. KG, Koenigsbach-Stein (DE)

(72) Inventor: Helmut F. Jaeger, Koenigsbach-Stein (DE)

(73) Assignee: Felsomat GmbH & Co. KG, Koenigsbach-Stein (DE)

( * ) Notice: Subject to any disclaimer, the term of this patent is extended or adjusted under 35 U.S.C. 154(b) by 188 days.

(21) Appl. No.: 14/214,783

(22) Filed: Mar. 15, 2014

(65) Prior Publication Data

US 2014/0199924 A1    Jul. 17, 2014

Related U.S. Application Data

(63) Continuation of application No. PCT/EP2012/067968, filed on Sep. 13, 2012.

(30) Foreign Application Priority Data

Sep. 16, 2011    (DE) .......................... 10 2011 082 869

(51) Int. Cl.
*B23F 19/05*    (2006.01)
*B24B 33/04*    (2006.01)
(Continued)

(52) U.S. Cl.
CPC ............... *B23F 19/05* (2013.01); *B23F 19/057* (2013.01); *B24B 33/00* (2013.01); *B24B 33/04* (2013.01); *B24B 33/081* (2013.01)

(58) Field of Classification Search
CPC ............ B23F 1/02; B23F 1/023; B23F 1/026; B24B 5/04; B24B 5/047; B24B 33/04; B24B 33/081; B24B 33/105; B24B 41/061; B24B 55/06; B24B 55/12
See application file for complete search history.

(56) References Cited

U.S. PATENT DOCUMENTS 3,760,538 A * 9/1973 Solheim .................. B24B 55/06
                                                      144/252.1
5,341,603 A * 8/1994 Pollock .................... B24B 5/423
                                                        451/180
(Continued)

FOREIGN PATENT DOCUMENTS

DE        2 1 23 000 A    12/1972
DE       93 10 682 U1      9/1994
(Continued)

OTHER PUBLICATIONS

C. Kobialka, K-J. Schaeferling, A. Tuerich; "Serienfertigung laufruhiger und hochbelastbarer Zahnraeder," Werkstatt und Betrieb, Jun. 30, 2011, Seiten 44-48, XP002694167, Munich.
(Continued)

*Primary Examiner* — Timothy V Eley
(74) *Attorney, Agent, or Firm* — Hackler Daghighian & Martino (57) ABSTRACT

A honing machine includes a machine housing enclosing a workpiece spindle and a tool spindle. The workpiece spindle includes a spindle collar with a spindle head configured to hold a workpiece. The tool spindle includes a cup-shaped holder with a honing ring located on an inside of the cup shaped holder. An operating tank is also located within the machine housing, where the operating tank surrounds the tool spindle in an oil-tight manner. The operating tank includes a panel with a recess, where the workpiece spindle is configured to insert the spindle head through the recess and form a first oil-tight seal between the recess and the spindle collar. The panel is moveable relative to the operating tank and tool spindle when the panel is carried along by the workpiece spindle during a feed motion. A second oil-tight seal is formed between the panel and the operating tank.

22 Claims, 5 Drawing Sheets

(51) Int. Cl.
*B24B 33/08* (2006.01)
*B24B 33/00* (2006.01)

(56) References Cited

U.S. PATENT DOCUMENTS

| | | | | |
|---|---|---|---|---|
| 5,347,760 | A * | 9/1994 | Miyauch | B23F 23/1231 451/114 |
| 6,164,881 | A | 12/2000 | Shono | |
| 6,572,730 | B1 * | 6/2003 | Shah | B24B 37/04 156/345.12 |
| 6,783,427 | B2 * | 8/2004 | Isobe | B24B 37/005 134/902 |
| 6,958,000 | B2 * | 10/2005 | Yoshioka | B23F 23/1281 409/55 |
| 6,997,782 | B2 * | 2/2006 | Nishi | B08B 1/04 451/41 |
| 7,172,495 | B2 * | 2/2007 | Kobialka | B23 23/1218 451/21 |
| 7,198,552 | B2 * | 4/2007 | Nishi | B08B 1/04 451/285 |
| 7,682,223 | B2 | 3/2010 | Wirz et al. | |
| 8,235,771 | B2 * | 8/2012 | Bankovic | B23F 19/057 409/9 |
| 2003/0207657 | A1 * | 11/2003 | Domanski | B24B 33/081 451/482 |

FOREIGN PATENT DOCUMENTS

| | | |
|---|---|---|
| DE | 201 07 369 U1 | 7/2001 |
| DE | 100 11 941 A1 | 9/2001 |
| DE | 10 2005 005 993 A1 | 8/2006 |
| DE | 10 2005 043 602 A1 | 3/2007 |
| JP | 2002 126967 A | 5/2002 |
| JP | 2003 25149 A | 1/2003 |
| JP | 2004 042178 A | 2/2004 |
| WO | 2006 084423 A1 | 8/2006 |

OTHER PUBLICATIONS

SynchroFine 205 HS.

* cited by examiner

HONING MACHINE WITH OIL-TIGHT OPERATING TANK

CROSS-REFERENCE TO RELATED APPLICATIONS

This continuation application claims priority to PCT/EP2012/067968 filed on Sep. 13, 2012 which has published as WO 2013/037897 A2 and also the German application number 10 2011 082 869.9 filed on Sep. 16, 2011, the contents of which are fully incorporated herein with these references.

FIELD OF THE INVENTION

The present invention generally relates to a honing machine having a workpiece spindle displaceable by a motor with a spindle collar and a spindle head, a tool spindle for a honing ring, and a machine housing in which the workpiece spindle and the tool spindle are located.

BACKGROUND OF THE INVENTION

A honing machine of this kind is already known in the art, for example, from the "SynchroFine 205 HS" brochure from PRÄWEMA Antriebstechnik GmbH, Eschwege/Werra, Del.

During honing, the tooth flanks of a toothed workpiece, such as a gear wheel or a gear unit, are hobbed against a so-called honing ring, which usually comprises a ceramic material or is coated with a ceramic material. Material is removed from the tooth flanks of the workpiece in this process. The honing ring is essentially circular in shape and comprises tooth flanks pointing radially inwards. When the workpiece and the honing ring are hobbed against one other, the honing ring is rotated by means of a tool spindle and the workpiece is likewise rotated by means of a workpiece spindle.

Considerable heat is generated when the honing ring and the workpiece are hobbed against one another. In order to prevent the honing ring and the workpiece overheating, these are cooled by oil. In this process the oil is usually sprayed onto the contact area between the honing ring and the workpiece at high pressure. The oil also washes away fine particles and dust at the same time during this operation.

A fine oil mist arises as a result of spraying the oil onto the fast-rotating honing ring and the even faster-rotating workpiece, said oil mist being dispersed within the honing machine and being deposited more or less throughout the honing machine, for example on the inner walls and roof of the machine housing. After the honing procedure, workpieces are regularly heavily coated with oil and have to be washed in some cases before any further processing. Overall, the honing machine can be a considerable source of contamination in a production line.

In the current state of the art, such as in the case of the "SynchroFine 205 HS", as mentioned above, parts of the honing machine, such as the workpiece feed region, are shielded from the tool spindle by intermediate walls to contain the oil mist dispersion.

The object of the invention is to create a honing machine with improved containment of oil mist dispersion. The present invention fulfills these needs and provides other related advantages.

SUMMARY OF THE INVENTION

An exemplary embodiment of the present invention includes a honing machine of the type mentioned initially, characterized by the fact that: an operating tank is located inside the machine housing, said tank surrounding the tool spindle in an oil-tight manner, the operating tank comprises a panel with a recess, it being possible to insert the workpiece spindle with the spindle head through the recess into the operating tank so that the spindle collar of the workpiece spindle seals the recess in an oil-tight manner, and the panel is mounted displaceably on the operating tank in an oil-tight manner so that the panel is carried along relative to the tool spindle during a feed motion of the workpiece spindle.

According to the present invention, the tool spindle is surrounded by an operating tank which confines the oil mist to its inner chamber. The operating tank is located inside the machine housing in this case and designed to be independent of the machine housing.

A panel with a recess (opening) is provided to enable the workpiece spindle or a workpiece carried on said spindle to access the operating tank. The workpiece spindle with the workpiece attached can be inserted into the recess so that the spindle collar then seals the recess in a completely oil-tight manner. As long as the spindle collar seals the opening, operations involving oil mist can be performed in the operating tank, such as spraying oil into the contact area between the honing ring and the workpiece during the actual honing procedure, or even spinning oil off the workpiece. When inserted, the workpiece spindle has the freedom of movement required to perform a feed motion towards the honing ring as the panel is mounted displaceably on the rest of the operating tank.

Seals, such as rubber seals, may be provided at the edge of the recess in the panel and in the region of the panel mount, to ensure oil-tightness. The operating tank typically also comprises a removable lid or a door so that the honing ring can be replaced in the event of wear or the type of workpiece can be replaced. This lid or door can also be sealed with seals, such as rubber seals. The operating tank is typically fully or partially made from sheet metal, especially sheet steel.

A deposit of oil mist on the inner walls and roof of the machine housing can be prevented by means of the oil-tight operating tank. It is possible to restrict the amount of oil deposited on or spinning onto the inner region of the operating tank. By spinning off the oil while it is still within the operating tank by means of the recess in the panel sealed by the workpiece spindle, it is also possible to obtain very clean workpieces by very simple means, which is often advantageous for processes following on from the honing procedure.

By restricting the oil mist to the inner chamber of the operating tank, large parts of the honing machine are also protected from the risk of explosion of an oil-air mixture. By locating the operating tank in the machine housing, the walls and roofs of the machine housing act as additional protective walls in the event of an explosion.

In an advantageous embodiment of the honing machine according to the invention, the tool spindle is aligned vertically with respect to its spindle axis. This makes it easier to mount the workpiece spindle, and the tool spindle can be loaded particularly simply, using the pick-up method, by a workpiece spindle which is also aligned vertically with its spindle axis.

An embodiment in which the operating tank is designed as an operating funnel is also preferable. With the funnel shape, a motor drive (such as an electric motor) can be arranged in the narrow region of the funnel in a space-saving manner. The narrow funnel region typically points downwards. In this case, it is also easy to collect any used oil.

A development of this embodiment in which the operating funnel comprises a preferably central lower oil drain is advantageous. Used oil can easily be removed via the lower oil drain. A central position (viewed radially) has been shown to be advisable in practice, but an oil drain in a non-central position is also possible. If required, the removed oil can be re-used in the honing process after cleaning or treatment.

An embodiment in which the tool spindle comprises a cup-shaped holder for the honing ring is especially preferable, an open side of the cup-shaped holder facing the recess and a closed side of the cup-shaped holder opposite the open side being fixed to a drive motor for the tool spindle. This ensures that the tool spindle has a compact design, especially compared to a holder which is driven by a motor located on a side section around the radial outer circumference of the holder. In this embodiment the drive motor is typically fixed to the closed side by means of a shaft which is constructed on or fixed to the closed side. When using an operating funnel, its inner chamber can be used to the optimum extent. It is also possible to accommodate parts of a hydraulic system for clamping the honing ring in position in the bottom section of the holder, which forms the closed side, thus also leading to a compact design. The bottom section is preferably designed to be continuous, but may also comprise recesses or holes. The bottom section provides the holder with mechanical stability. The described cup-shaped holder is thus also advantageous if the drive motor is not fixed to the closed side, which corresponds to another embodiment of the honing machine according to the invention.

An especially preferable embodiment is one in which the inner chamber of the operating tank is a maximum of three, or preferably a maximum of two, times larger than the space required by the tool spindle in the operating tank. This minimizes the area which can be contaminated by oil mist. Practical experience has shown that it is a good idea if the inner chamber of the operating tank is about twice as large as the area taken up by the tool spindle. All the necessary components can still be accommodated satisfactorily in the operating tank. The theoretical area which is at risk of explosion is minimized.

An embodiment in which the operating tank is connected to an explosion vent pipe, and especially where the explosion vent pipe leads to a region above the honing machine, is also advantageous. The explosion vent pipe prevents the walls of the operating tank being blown up or torn apart in the event of an explosion. The blast wave can escape through the vent pipe. This ensures improved protection for workers in the surrounding area. There are not normally any workers in the area above the honing machine (especially in the region of the roof of a building in which the honing machine is installed), thus safety is further improved if the explosion vent pipe leads accordingly to this area.

An embodiment in which the workpiece spindle is designed to turn a workpiece held on the spindle head at a speed of 10,000 rpm or more, preferably 15,000 rpm or more, is advantageous. Workpieces can be spun dry as a result of this high speed, i.e. the amount of oil (or contamination) remaining on the workpiece is negligible.

A particularly preferable embodiment of the honing machine according to the invention is where the honing machine has an electronic controller which can be used to control at least the displacement motion and speed of the workpiece spindle, and the electronic controller is programmed to spin a workpiece held on the spindle head of the workpiece spindle at high speed in the oil-tight operating tank after a honing procedure on this workpiece. During the honing procedure the workpiece is sprayed with oil (and contamination). The workpiece can be dried (and cleaned) by spinning at high speed. In this process the oil is only dispersed inside the operating tank (and not in the machine housing and especially not on the walls and roof of the machine housing) as the spindle collar seals the recess in the panel. Spin-drying takes place without any contact with the honing ring. Within the scope of the invention, speeds of 5,000 rpm are in particular regarded as high. The speed during spinning (spin-drying) is preferably at least 10,000 rpm.

In a preferred development of this embodiment the electronic controller is programmed to reach a higher speed when spinning the workpiece than in the preceding honing procedure on the workpiece. This thus improves drying and cleaning of the workpiece. If required, drying (and cleaning) during spinning can also be improved by blowing in compressed air; note that compressed air can be used in any speed range during this process as a general rule.

The scope of the present invention also covers usage of the above embodiment or its above development in accordance with the way the electronic controller is programmed. Particularly clean and dry workpieces can be achieved by spinning after the preceding honing procedure.

Further advantages of the invention will become evident from the description and the drawings. According to the invention, the features described above and explained in further detail can also be used individually or combined in any way or number. The embodiments illustrated and described should not be regarded as a complete list, but rather as examples describing the invention.

BRIEF DESCRIPTION OF THE DRAWINGS

The invention is illustrated in the drawings and explained with the aid of embodiments. The figures are as follows.

DETAILED DESCRIPTION OF THE PREFERRED EMBODIMENTS

Figure 1:
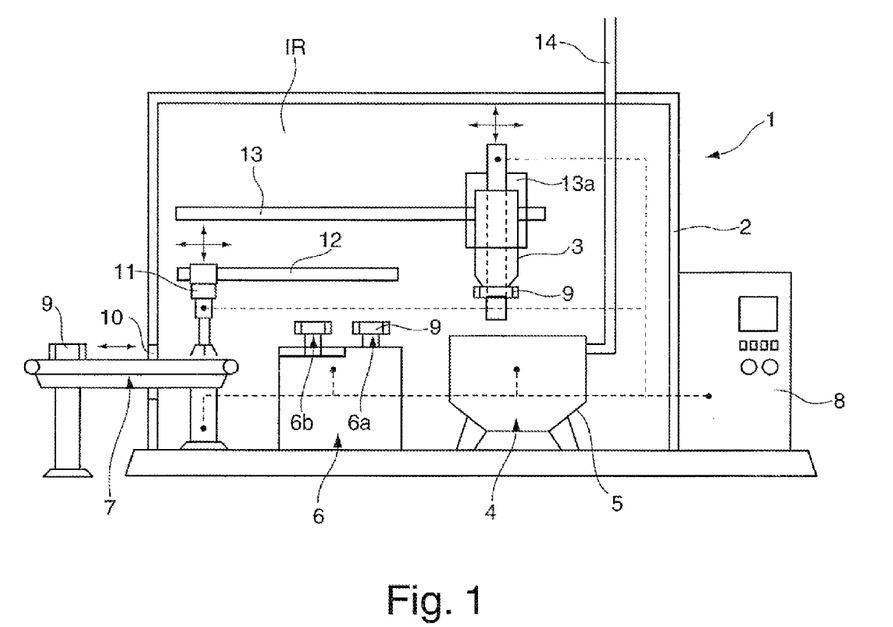
FIG. 1 is a schematic side view of a honing machine according to the invention.

FIG. 1 shows a honing machine 1 according to the invention, comprising a workpiece spindle 3 and a tool spindle 4, said tool spindle 4 being arranged in an oil-tight operating tank 5 and therefore concealed in FIG. 1. The honing machine 1 further comprises a testing station 6, a loading station 7 and an electronic controller 8. In the illustrated embodiment, the electronic controller 8 and part of the loading station 7 are arranged outside a machine housing 2 for the honing machine 1. The remaining assemblies are located inside the machine housing 2. Side walls, a roof and a floor plate form part of the machine housing 2 in this case and all surround an inner chamber IR.

Workpieces 9 which are supplied to the loading station 7 in a manner which is not illustrated in any greater detail are brought into the inner chamber IR, by means of a conveyor belt system in the loading station 7, through an opening 10 in the machine housing 2. The workpiece 9 can be picked up here using a gripper 11 which is telescopic in the vertical direction and which can be displaced horizontally on a portal system 12, then the workpiece 9 can be taken to the testing station 6 and placed on a test holder 6a. A master wheel 6b can then be moved horizontally onto the workpiece 9 on the test holder 6a and hobbed against said workpiece. The quality of the workpiece 9 can be verified from the displacement position of the master wheel 6b during this hobbing operation. A workpiece 9 which is found to be unsuitable for further processing is taken back to the loading station 7 by the gripper 11 and transferred out.

Figure 2A:
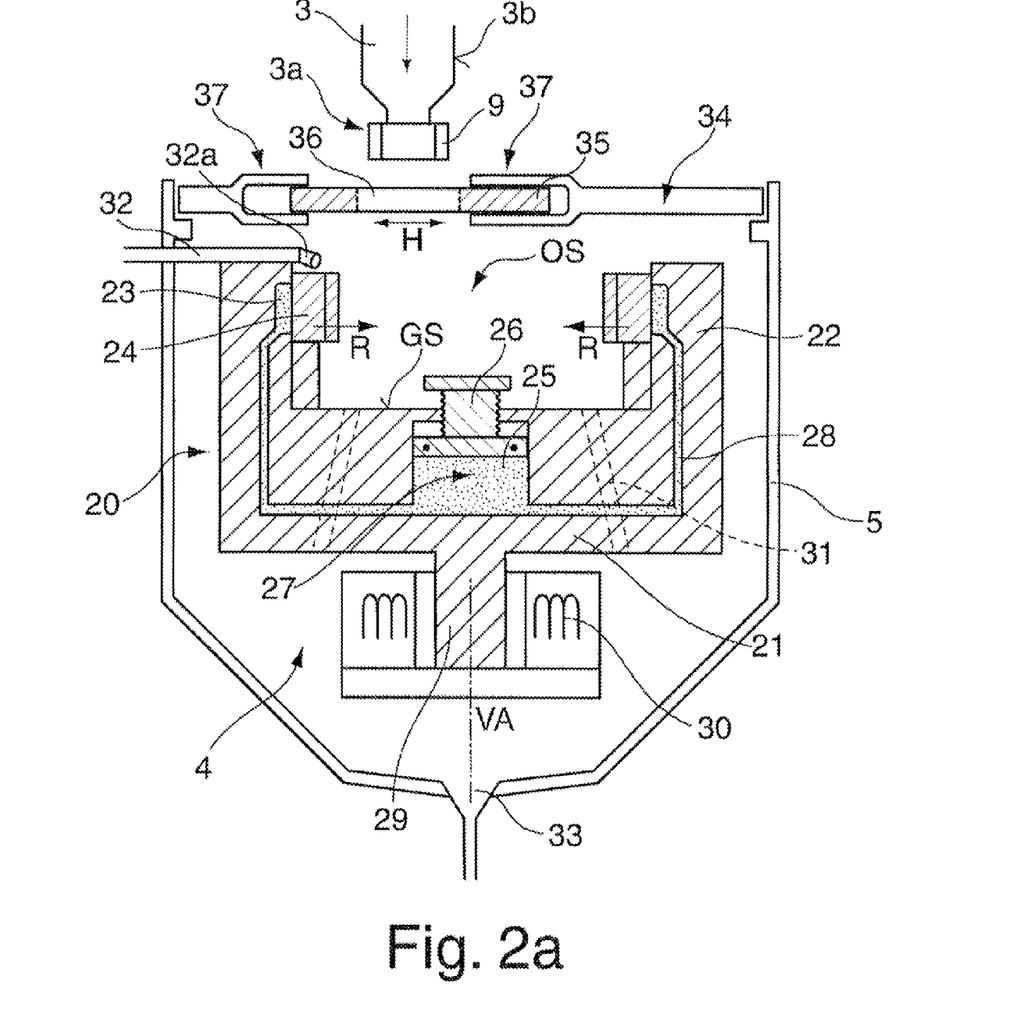
FIG. 2a is a schematic vertical cross-section through the tool spindle in the operating tank in FIG. 1, with the workpiece spindle retracted.
Figure 2B:
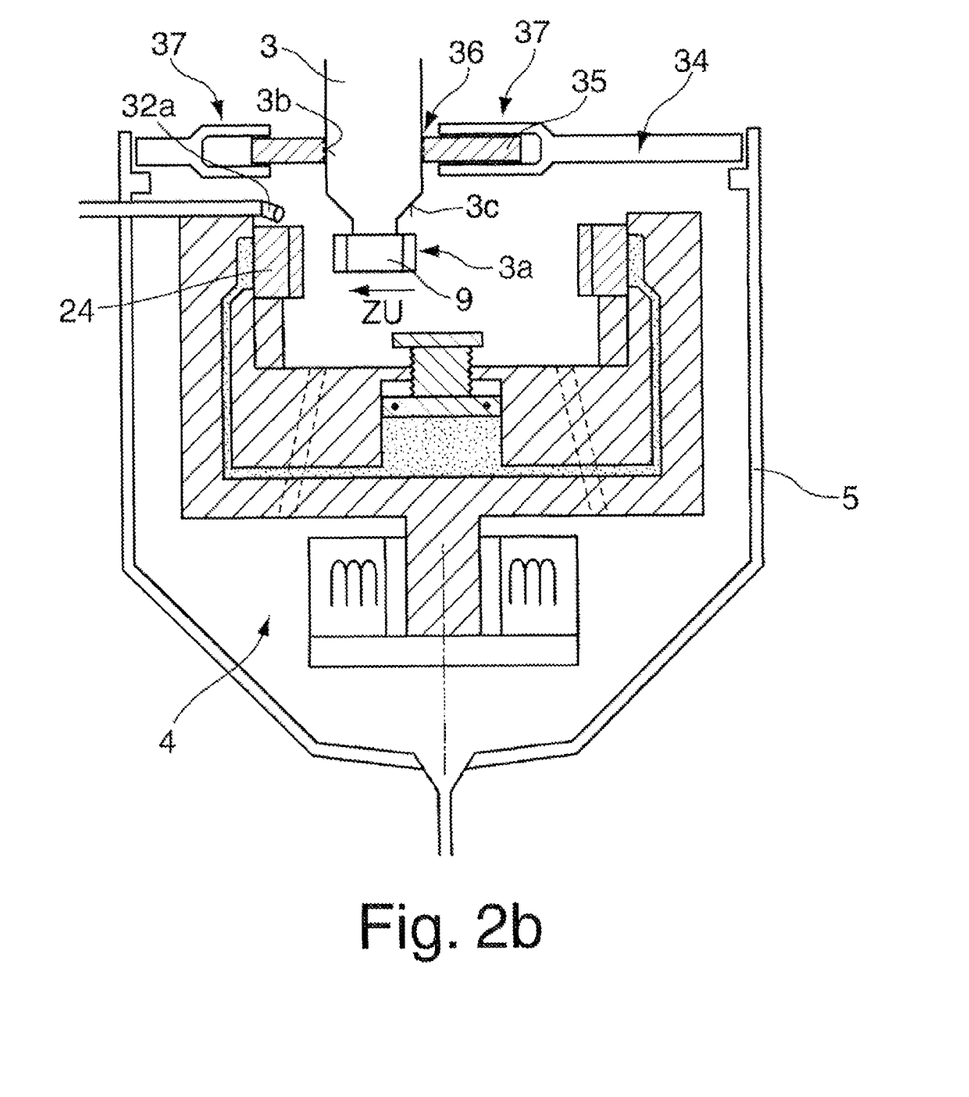
FIG. 2b is a schematic vertical cross-section through the tool spindle in the operating tank in FIG. 1, with the workpiece spindle inserted, but without any contact between the workpiece and the honing ring.
Figure 2C:
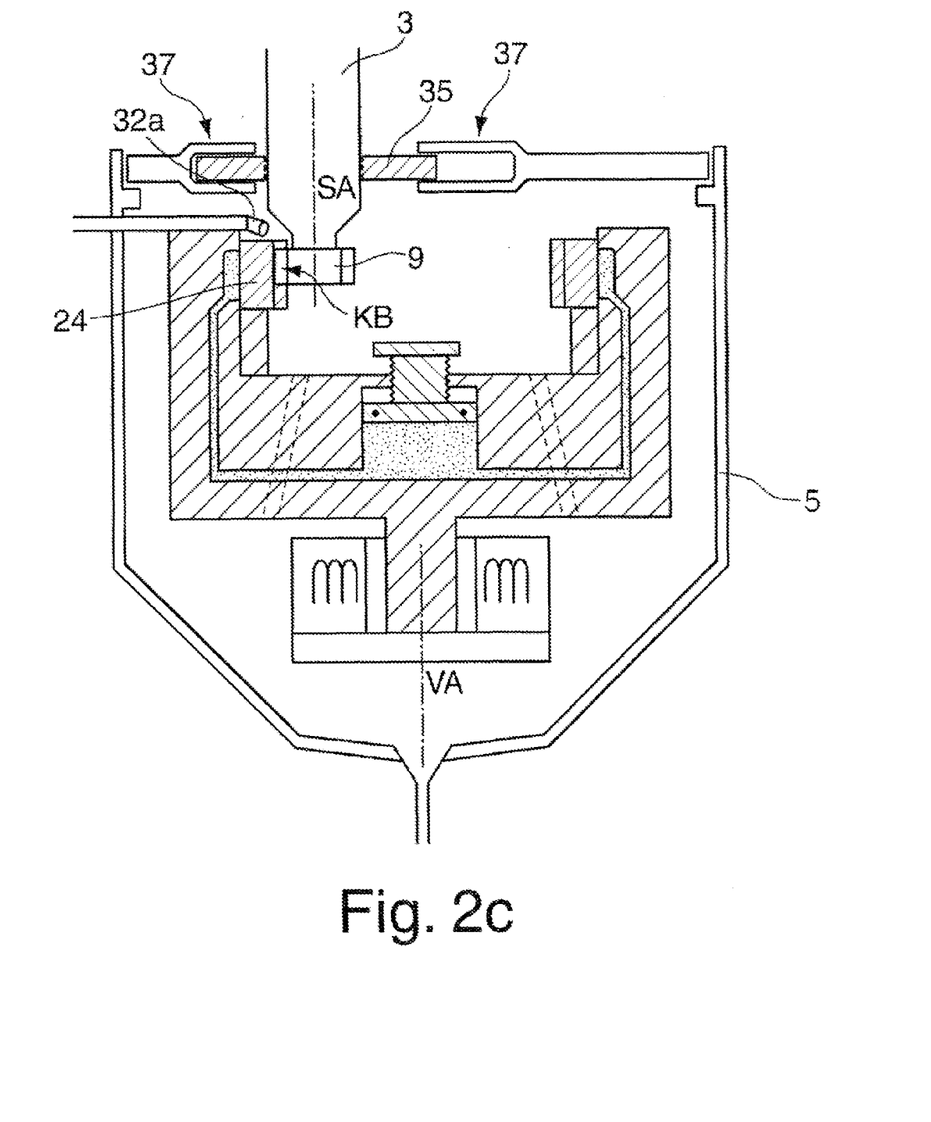
FIG. 2c is a schematic vertical cross-section through the tool spindle in the operating tank in FIG. 1, with the workpiece spindle inserted, and the workpiece engaged in the honing ring.

A workpiece 9 which is found to be suitable for further processing is picked up by the workpiece spindle 3 using the pick-up method, taken to the fixed tool spindle 4 using a portal system 13 (comprising a compound slide rest 13a, so that the workpiece spindle 3 can be moved horizontally and vertically), and subjected to a honing procedure here (see FIG. 2a-2c). The workpiece 9 is then taken off the workpiece spindle 3 and taken back to the loading station 7 by the portal system 13 and transferred out.

During this operation the electronic controller 8 controls the loading station 7, the testing station 6, the gripper 11, including the portal system 12, the workpiece spindle 3 (also with respect to speed and relative phase) including the portal system 13 and also the tool spindle 4 (with respect to speed and relative phase), see the monitoring and control lines shown by way of dashes. In the illustrated embodiment, the electronic controller is responsible for coordinating workpiece transfer operations, test hobbing and performing the honing procedure, including spinning (see below). Note that the electronic controller 8 can also be located inside the machine housing 2 in an alternative design.

The tool spindle 4 is located in the operating tank 5 which is funnel-shaped in this case. The operating tank 5 has its own oil-tight boundaries on all sides (with the exception of a recess for the workpiece spindle 3, see below), said boundaries preferably being made from sheet steel, and in particular having no walls in common with the walls of the machine housing 2 (including roof and floor plate). The operating tank 5 is mounted on adjustable feet in this case. The operating tank 5 has an explosion vent pipe 14 which leads to above the honing machine 1, preferably into the open air through a building roof.

FIG. 2a shows the region of the tool spindle 4 in the operating tank 5 from FIG. 1 in detail. The tool spindle 4 comprises a cup-shaped holder 20, which in this case is positioned with its open side OS at the top and its closed side GS at the bottom. The cup-shaped holder 20 accordingly has a bottom section 21 and a circumferential side section 22. The circumferential side section 22 comprises a circumferential hydraulic expansion element 23 on its inner side, a honing ring 24 being able to be clamped in the radial direction R and centered in the holder 20 by means of said expansion element. When the pressure of a hydraulic medium 25, shown as a dotted area, rises, the expansion element 23 expands radially inwards and vice versa. The pressure of the hydraulic medium 25 can be adjusted by means of an adjustment element (in this case an adjustment screw 26, which determines the partial volume of a hydraulic chamber 27 which is filled with hydraulic medium 25). The hydraulic expansion element 23 is connected to the hydraulic chamber 27 by means of a plurality of hydraulic lines 28. The hydraulic chamber 27, the adjustment element and the hydraulic lines 28 in some cases are located in the bottom section 21, so that the tool spindle 4 can be designed to be compact in the radial direction (in the horizontal direction in FIG. 2a) (also see FIG. 3 for the hydraulic system).

The holder 20 has a shaft 29 on the bottom side. The holder 20 is mounted on said shaft and the holder 20 is able to be driven by means of a drive motor 30, which is an electric motor in this case, via said shaft. The holder 20 (and thus also the honing ring 24) rotates around a vertical axis VA for the honing procedure. Drainage channels 31 are also provided in the holder 20, through which the oil, which is sprayed onto the contact area between the honing ring 24 and the workpiece 9 during the honing procedure (via an oil feed line 32 which is not fixed to the holder 20 and which has an oil nozzle 32a), can flow out of the cup-shaped holder 20; during this operation an oil pressure of 40 bar and over, preferably 60 bar and over, can be used. The operating tank 5 has a central drain 33 on its underside for oil, through which used oil can drain.

The operating tank 5 surrounds the tool spindle 4, comprising the holder 20 (including the shaft 29 and honing ring 24) and the drive motor 30, in a funnel shape. The boundary walls of the operating tank 5 are designed to be oil-tight. The partial volume of the inner chamber of the operating tank 5 taken up by the tool spindle 4 (including the area in the "cup" surrounded by the circumferential side section 22) in this case corresponds to approximately half the overall volume of the inner chamber of the operating tank 5, i.e. the inner chamber of the operating tank 5 is approximately twice as large as the space required by the tool spindle 4.

The upper side of the operating tank 5 is formed by a lid 34, which is fixed in a rigid and oil-tight manner to the rest of the operating tank 5 during normal operation in a manner which is not shown in greater detail, and said lid can be removed in order to change the honing ring 24. The operating tank 5 otherwise has no doors or similar items. The lid 34 comprises a panel 35, which is mounted in the lid 34 such that it can be moved in the horizontal direction H in a mount 37 which has a C-shaped cross-section on both sides. The lid 34 (including the panel 35) seals the upper region of the operating tank 5 in an oil-tight manner with the exception of a recess (opening) 36.

The workpiece spindle 3 can be inserted into the operating tank 5 through the recess 36. To this end, a spindle head 3a of the workpiece spindle 3, said spindle head carrying a workpiece 9, is first inserted into the recess 36. In the situation illustrated in FIG. 2a, the workpiece spindle 3 must be moved downwards for this purpose.

If the panel 35 with the recess 36 is not positioned precisely beneath the workpiece spindle 3, the panel 35 is aligned by means of tapered surfaces 3c on the workpiece spindle 3 in its mount 37 in the lid 34, such that a spindle collar 3b seals the recess 36 in an oil-tight manner when the workpiece spindle 3 is lowered further, see FIG. 2b.

The workpiece 9 can then be advanced to the left towards the honing ring 24 by moving the workpiece spindle 3, see ZU arrow. The panel 35 in its mount 37 is also carried along in this operation, or in other words moved to the left.

FIG. 2c then shows the position in which the workpiece 9, a gear wheel in this case, is inserted completely into the toothed flank of the honing ring 24 with its toothed flank. In this position, the honing ring 24 is rotated around the vertical axis VA and the workpiece 9 is rotated around the likewise vertical spindle axis SA and the two are hobbed against one another. Oil is sprayed through the oil nozzle 32a for cooling purposes and to remove dust from the contact area KB between the honing ring (tool) 24 and the workpiece 9, at least during hobbing.

After the honing procedure on the workpiece 9, said workpiece is moved back to the right, again in the horizontal direction, by means of the workpiece spindle 3, for example into the position shown in FIG. 2b. Here the workpiece spindle 3, with the oil supply to the oil nozzle 32a switched off, can again operate at high speed by means of the workpiece 9 in order to spin the workpiece 9 dry. The speed is preferably higher during spin-drying than during the honing procedure. Typical speeds during spin-drying within the scope of the invention are at least 10,000 rpm. The oil, which is released from the workpiece 9 during spin-drying, remains inside the operating tank 5 as the recess 36 remains blocked by the spindle collar 3b, and thus the operating tank 5 is hermetically sealed. After spin-drying, the workpiece 9 with the workpiece spindle 3 can be retracted upwards from the operating tank 5 through the recess 36.

Figure 3:
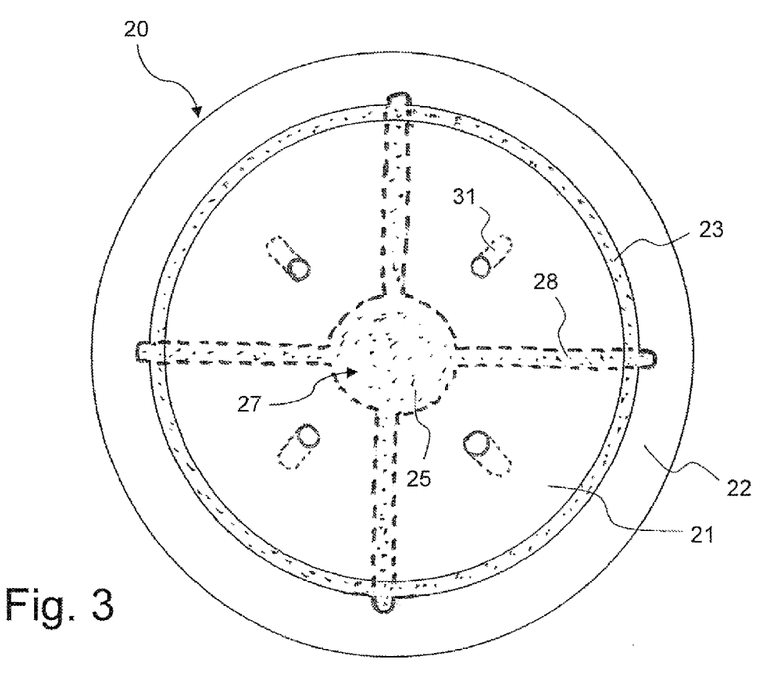
FIG. 3 is a schematic horizontal cross-section through the cup-shaped holder from the tool spindle in FIG. 2 at the level of a circumferential hydraulic sealing element, with additional marking showing structures lying beneath the level of the cross-section.

FIG. 3 illustrates parts of the hydraulic system for the holder 20 in a horizontal cross-section, concealed structures located beneath the level of the cross-section are shown as dashed lines.

The circumferential hydraulic expansion element 23 is formed on the inner side of the circumferential side section 22. This expansion element 23 is connected to the central hydraulic chamber 27 (viewed radially) in the bottom section 21 by means of four hydraulic lines 28 which run in a star formation in this case. The pressure in the expansion element 23 can be adjusted in a simple manner via the hydraulic lines 28 by means of the (single) adjustment element (see reference numeral 26 for the adjustment screw in FIG. 2a), with which the pressure in the hydraulic chamber 27 is adjusted.

The drainage channels 31 through which oil can be drained through the bottom section 21 into the lower region of the operating tank 5 are also shown. Note that the drainage channels 31 on the upper side of the bottom section 21 may also open closer to the circumferential side section 22, especially on the edge of the circumferential side section 22, so that the oil carried outwards as a result of centrifugal force during rotation of the holder 20 can be drained more readily.

Although several embodiments have been described in detail for purposes of illustration, various modifications may be made to each without departing from the scope and spirit of the invention. Accordingly, the invention is not to be limited, except as by the appended claims.

What is claimed is:

1. A honing machine, comprising:
   a machine housing;
   a workpiece spindle located within the machine housing, the workpiece spindle comprising a spindle collar with a spindle head, where the spindle head is configured to hold a workpiece, and where the workpiece spindle is translatable by motor in a vertical and horizontal direction;
   a tool spindle located within the machine housing, the tool spindle comprising a holder with a honing ring; and
   an operating tank located within the machine housing, the operating tank surrounding the tool spindle in an oil-tight manner, where the operating tank comprises a panel with a recess, where the workpiece spindle is configured to insert the spindle head through the recess and form a first oil-tight seal between the recess and the spindle collar;
   wherein the panel is moveable relative to the operating tank and tool spindle when the panel is carried along by the workpiece spindle during a feed motion, where a second oil-tight seal is formed between the panel and the operating tank.

2. The honing machine of claim 1, wherein the tool spindle is aligned vertically along a spindle axis.

3. The honing machine of claim 2, wherein a bottom portion of the operating tank comprises an operating funnel.

4. The honing machine of claim 3, wherein the operating funnel comprises an oil drain located at the bottom portion of the operating funnel.

5. The honing machine of claim 1, wherein the holder is cup-shaped, with the honing ring located on an inside of the cup-shaped holder, and wherein the cup-shaped holder comprises an open side facing upwards towards the recess in the panel.

6. The honing machine of claim 5, wherein the cup-shaped holder comprises a circumferential side section attached to a bottom section, where the bottom section is opposite the open side.

7. The honing machine of claim 6, including a shaft extending downward from the bottom section, where the shaft and cup-shaped holder are rotatable about a vertical axis by a drive motor.

8. The honing machine of claim 6, including a drive motor, wherein the bottom section is mechanically coupled to the drive motor, and wherein the cup-shaped holder is rotatable about a vertical axis by the drive motor.

9. The honing machine of claim 1, wherein the operating tank defines an inner chamber, where the inner chamber is less than three times larger than a space required by the tool spindle.

10. The honing machine of claim 1, wherein the operating tank defines an inner chamber, where the inner chamber is less than two times larger than a space required by the tool spindle.

11. The honing machine of claim 1, including an explosion vent pipe, where the explosion vent pipe has a first end in fluid communication with the operating tank and a second end disposed through the machine housing and in fluid communication with an outside environment above the honing machine.

12. The honing machine of claim 1, wherein the workpiece spindle is rotatable about a vertical axis at a speed of more than 10,000 rpm.

13. The honing machine of claim 1, wherein the workpiece spindle is rotatable about a vertical axis at a speed of more than 15,000 rpm.

14. The honing machine of claim 1, including an electronic controller electrically controlling the translation and rotation of the workpiece spindle.

15. The honing machine of claim 14, wherein after a honing procedure on a workpiece is completed the electronic controller is programmed to spin the workpiece held on the spindle head of the workpiece spindle at a higher speed than in comparison to a speed of the honing procedure.

16. The honing machine of claim 1, wherein the operating tank comprises a removable lid, wherein a third oil-tight seal is formed between the lid and the operating tank.

17. The honing machine of claim 16, wherein the panel is movably disposed within the removable lid.

18. A honing machine, comprising:
   a machine housing;
   a workpiece spindle located within the machine housing, the workpiece spindle comprising a spindle collar with a spindle head, where the spindle head is configured to hold a workpiece, and where the workpiece spindle is translatable by motor in a vertical and horizontal direction;
   a tool spindle located within the machine housing, the tool spindle comprising a cup-shaped holder with a honing ring located on an inside of the cup-shaped holder, where the cup-shaped holder comprises a circumferential side section attached to a bottom section, where the bottom section is opposite an open side, and wherein the cup-shaped holder includes a shaft extending downward from the bottom section; an operating tank located within the machine housing, the operating tank surrounding the tool spindle in an oil-tight manner;

a lid removably attached to the operating tank forming a first oil-tight seal, where the lid comprises a panel with a recess, where the workpiece spindle is configured to insert the spindle head through the recess and form a second oil-tight seal between the recess and the spindle collar;

wherein the panel is moveable relative to the lid and tool spindle when the panel is carried along by the workpiece spindle during a feed motion, where a third oil-tight seal is formed between the panel and the lid.

19. The honing machine of claim 18, including a drive motor located below the bottom section, wherein the cup-shaped holder and shaft are rotatable by means of the drive motor.

20. The honing machine of claim 19, including an electronic controller electrically controlling the translation and rotation of the workpiece spindle.

21. The honing machine of claim 20, wherein the electronic controller is programmed to spin a workpiece held on the spindle head of the workpiece spindle at a high speed in the operating tank after a honing procedure on the workpiece was completed.

22. The honing machine of claim 21, including an explosion vent pipe, where the explosion vent pipe has a first end in fluid communication with the operating tank and a second end disposed through the machine housing and in fluid communication with an outside environment above the honing machine.

* * * * *